United States Patent
Déjean et al.

(10) Patent No.: US 9,613,267 B2
(45) Date of Patent: *Apr. 4, 2017

(54) METHOD AND SYSTEM OF EXTRACTING LABEL:VALUE DATA FROM A DOCUMENT

(71) Applicant: Xerox Corporation, Norwalk, CT (US)

(72) Inventors: Hervé Déjean, Grenoble (FR); Thierry Lehoux, Grenoble (FR); Eric H. Cheminot, Meylan (FR)

(73) Assignee: Xerox Corporation, Norwalk, CT (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/475,809

(22) Filed: Sep. 3, 2014

(65) Prior Publication Data
US 2016/0063322 A1    Mar. 3, 2016

(51) Int. Cl.
G06K 9/62    (2006.01)
G06K 9/00    (2006.01)
G06K 9/72    (2006.01)

(52) U.S. Cl.
CPC ..... *G06K 9/00449* (2013.01); *G06K 9/00442* (2013.01); *G06K 9/00463* (2013.01); *G06K 9/00469* (2013.01); *G06K 9/72* (2013.01)

(58) Field of Classification Search
CPC ...... G06F 17/24; G06F 17/211; G06F 17/212; G06F 17/2247
USPC ...................................................... 715/209
See application file for complete search history.

(56) References Cited

U.S. PATENT DOCUMENTS

| 4,843,569 | A | * | 6/1989 | Sawada | G01C 21/32 382/180 |
|---|---|---|---|---|---|
| 6,826,727 | B1 | * | 11/2004 | Mohr | G06F 17/211 382/180 |
| 7,415,664 | B2 | * | 8/2008 | Aureglia | G06F 17/246 715/212 |
| 7,668,372 | B2 | | 2/2010 | Schiehlen | |
| 7,752,538 | B2 | | 7/2010 | Vion-Dury | |
| 7,890,928 | B2 | * | 2/2011 | Patrudu | G06F 17/2785 707/802 |
| 8,270,721 | B2 | | 9/2012 | Schiehlen | |
| 8,885,951 | B1 | * | 11/2014 | Cristofano | G06K 9/00449 382/173 |
| 9,213,681 | B2 | * | 12/2015 | Sorotokin | G06F 17/211 |
| 2002/0152142 | A1 | * | 10/2002 | Schellmann | G06Q 40/00 705/30 |

(Continued)

OTHER PUBLICATIONS

U.S. Appl. No. 13/911,452, filed Jun. 6, 2013, Hervé Déjean.

(Continued)

*Primary Examiner* — Scott Baderman
*Assistant Examiner* — Hassan Mrabi
(74) *Attorney, Agent, or Firm* — Fay Sharpe LLP

(57) ABSTRACT

This disclosure provides an exemplary method and system for extracting structured label and value pairwise textual data from a textual document. According to an exemplary method, initially a layout analysis is performed resulting in one or more alternatives for grouping and ordering the textual elements of interest. Next, textual elements are tagged as including a label term, a value term or a label and value term. Finally, a sequence-based method is applied to the tagged elements to generate one or more sequence listings representative of the label and value pairwise data structure(s) and label:value pairwise data is extracted.

25 Claims, 9 Drawing Sheets

(56) References Cited

U.S. PATENT DOCUMENTS

| | | | |
|---|---|---|---|
| 2002/0174082 A1* | 11/2002 | Miloushev | G06F 8/36 706/47 |
| 2004/0111400 A1* | 6/2004 | Chevalier | G06F 17/3089 |
| 2005/0091038 A1* | 4/2005 | Yi | G06F 17/2715 704/10 |
| 2005/0137846 A1* | 6/2005 | Rose | G06F 17/2217 704/2 |
| 2005/0138146 A1* | 6/2005 | Rose | G06Q 40/00 709/219 |
| 2011/0249905 A1* | 10/2011 | Singh | G06K 9/00449 382/225 |
| 2011/0258195 A1* | 10/2011 | Welling | G06K 9/00442 707/740 |
| 2011/0264582 A1* | 10/2011 | Kim | G06Q 20/102 705/40 |
| 2012/0047100 A1* | 2/2012 | Lehner | G06F 8/34 706/46 |
| 2012/0198369 A1* | 8/2012 | Sorin | G06Q 10/10 715/763 |
| 2012/0284259 A1* | 11/2012 | Jehuda | G06F 17/30734 707/722 |
| 2013/0047155 A1* | 2/2013 | Caspole | G06F 9/445 718/1 |
| 2013/0085815 A1* | 4/2013 | Onischuk | G07C 13/00 705/12 |
| 2013/0191723 A1* | 7/2013 | Pappas | G06F 17/30917 715/234 |
| 2013/0311875 A1* | 11/2013 | Pappas | G06F 17/2247 715/234 |
| 2013/0321867 A1 | 12/2013 | Déjean | |
| 2013/0343658 A1* | 12/2013 | Dejean | G06K 9/00463 382/203 |
| 2014/0040719 A1* | 2/2014 | Sorotokin | G06F 17/211 715/234 |
| 2014/0212038 A1* | 7/2014 | Dejean | G06K 9/00463 382/176 |
| 2014/0231512 A1* | 8/2014 | Onischuk | G07C 13/00 235/386 |
| 2014/0365281 A1* | 12/2014 | Onischuk | G07C 13/00 705/12 |
| 2014/0365872 A1* | 12/2014 | Dejean | G06K 9/00463 715/243 |
| 2015/0012339 A1* | 1/2015 | Onischuk | G07C 13/00 705/12 |
| 2015/0199581 A1* | 7/2015 | Zhang | G06K 9/3216 382/182 |
| 2015/0278189 A1* | 10/2015 | Booth | G06F 17/277 704/9 |
| 2015/0339268 A1* | 11/2015 | Bednarz, Jr. | H04L 67/02 715/248 |
| 2015/0356157 A1* | 12/2015 | Anderson | G06F 9/5066 707/756 |
| 2015/0356971 A1* | 12/2015 | Stolcke | H04N 7/183 704/231 |

OTHER PUBLICATIONS

U.S. Appl. No. 13/943,263, filed Jul. 16, 2013, Hervé Déjean.
U.S. Appl. No. 14/107,333, filed Dec. 16, 2013, Hervé Déjean et al.
Belaïd, Yolande and Belaïd, Abdel, article entitled "Morphological Tagging Approach in Document Analysis of Invoices", 17th International Conference on Pattern Recognition (ICPR'2004). (Cambridge, UK). IEEE, 2004. pp. 469-472.
Alberto Bartoli, Giorgio Davanzo, Eric Medvet, and Enrico Sorio, article entitled "Semisupervised Wrapper Choice and Generation for Print-Oriented Documents", Department of Engineering and Architecture (DIA), University of Trieste, Via Valerio 10, 34127 Trieste, Italy, IEEE Transactions on Knowledge and Data Engineering, vol. 26, No. 1, Jan. 2014, pp. 208-220.
Bill Janssen, Eric Saund, Eric Bier, Patricia Wall, and Mary Ann Sprague, article entitled "Receipts2go: The Big World of Small Documents", In Proceedings of the 2012 ACM symposium on Document Engineering (DocEng '12), Sep. 4-7, 2012, 4 pages.

* cited by examiner

| BILL TO CODE | INVOICE DATE | INVOICE NO |
|---|---|---|
| 01033 | 07/03/2008 | FC028418 |
| SHIP DATE | TRACTOR NO. | TRAILER NO. |
| 06/25/2008 | G4616 | |

FIG. 1

| DATE SHIPPED | SHIPPED VIA | TERMS | YOUR ORDER NO. | OUR JOB NO. |
|---|---|---|---|---|
| 4/16/08 | STAR DEL | SEE BELOW | 425800625 | 244237 |

FIG. 2

| | ORIGINAL INVOICE | |
|---|---|---|
| GRAINGER ACCOUNT NUMBER | | ▮▮▮▮▮▮▮▮ |
| INVOICE NUMBER | | 9630486745 |
| INVOICE DATE | | 05/02/2008 |
| DUE DATE | | 06/01/2008 |
| AMOUNT DUE | | 487.82 |

PO NUMBER :      6606566
CALLER :         ▮▮▮▮▮▮▮▮
CUSTOMER PHONE : ▮▮▮▮▮▮▮▮
DELIVERY NUMBER : 6071729803
INCO TERMS :     FOB ORIGIN

FIG. 3

| | | | |
|---|---|---|---|
| CUSTOMER ID | GPC100 | BILL OF LADING: | 3995918 |
| P.O. NUMBER | STANDING | SHIPPER: | GTI |
| SHIPMENT DATE | 05/08/08 | ISSUE NOTE: | IS150665 |
| TERMS: | N35 | ORDER NO. | SO0054076 |
| | | ORIGINAL ORDER | |

POD DATE: 4/23/2008    TIME: 10:45    PCS DIVD: 1    RCVD BY: ▮▮▮▮▮

FIG. 6

| ACTUAL WT. | AIR VOLUME WT. | CHARGEABLE WT. |
|---|---|---|
| 163 LBS. | 0 LBS. | 163 LBS. |
| 74 KGS. | 0 KGS. | 74 KGS. |

FIG. 7

| P.O. NUMBER | SHIP DATE | SHIPPED VIA | INV. DATE | TERMS | MC JOB # |
|---|---|---|---|---|---|
| 653875 | 7/9/2008 | UPS | 7/9/2008 | 1% 10 NET 30 | 8994 |

FREIGHT INVOICE

INVOICE NO. V0025599

BILL TO
ATTN: ACCTS PAYABLE
LA MIRADA, CA 90638

| BILL TO CODE | INVOICE DATE | INVOICE NO. |
|---|---|---|
| 00164 | 06/24/2008 | V0025599 |
| SHIP DATE | TRACTOR NO. | TRAILER NO. |
| 06/19/2008 | | |

| BILL OF LADING NO | BOOKING NO. | P.O. NO. | OTHER NO. | RELEASE NO. |
|---|---|---|---|---|
| 529893 | 9893 | | 00442037 | |

| SHIPPER | CONSIGNEE |
|---|---|
| CA | CA |

| DESCRIPTION | BILLING FACTOR | BILLING RATE | CHARGES |
|---|---|---|---|
| 101 - LINE HAUL | | 578.00 | 578.00 |

| COMMODITY | MILES | TOTAL CHARGES | |
|---|---|---|---|
| CORRUGATED | 385.00 RAND MCNALLY HHG | | $578.00 |
| BILLING NOTES | | PLEASE REMIT TO: CHINO, CA 9170... REGULATIONS REQUIRE PAYMENT WITHIN SEVEN (7) DAYS | |

FIG. 9

FREIGHT INVOICE

1000 ████████████

V " 2 5 5 '
INVOICE NO.

BILL TO
████████████
ATTN: ACCTS PAYABLE
████████████
LA MIRADA, CA 90638

| BILL TO CODE | INVOICE DATE | INVOICE NO. |
|---|---|---|
| 00164 | 06/24/2008 | V0025599 |
| SHIP DATE | TRACTOR NO. | TRAILER NO: V.4 |
| 06/19/2008 | | |

| BILL OF LADING NO | BOOKING NO. | P.O. NO. | OTHER NO. | RELEASE NO. |
|---|---|---|---|---|
| 529893 | 9893 | | 00442037 | |

| SHIPPER | CONSIGNEE |
|---|---|
| ████████ CA | ████████ HAYWARD CA |

| DESCRIPTION | BILLING FACTOR | BILLING RATE | CHARGES |
|---|---|---|---|
| 101 - LINE HAUL | | 578.00 | 578.00 |

| COMMODITY | MILES | |
|---|---|---|
| CORRUGATED | 385.00 RAND MCNALLY HHG | CHARGES $578.00 |
| BILLING NOTES | | PLEASE REMIT TO: ████████ CHINO, CA 91708████ *REGULATIONS REQUIRE PAYMENT WITHIN SEVEN (7) DAYS* |

FIG. 10

BILL TO

ATTN: ACCTS PAYABLE
LA MIRADA, CA 90638

| BILL TO CODE | INVOICE DATE | INVOICE NO. |
|---|---|---|
| 00164 | 06/24/2008 | V0025599 |
| SHIP DATE | TRACTOR NO. | TRAILER NO. |
| 06/19/2008 | | |

1104
1102

| BILL OF LADING NO. | BOOKING NO. | P.O. NO. | OTHER NO. | RELEASE NO. |
|---|---|---|---|---|
| 529893 | 9893 | | 00442037 | |

| SHIPPER | CONSIGNEE |
|---|---|
| CA | CA |

METHOD AND SYSTEM OF EXTRACTING LABEL:VALUE DATA FROM A DOCUMENT

CROSS REFERENCE TO RELATED PATENTS AND APPLICATIONS

U.S. patent application Ser. No. 13/484,708, filed May 31, 2012, Publication No. 2013/0321867, published Dec. 5, 2013, by Hervé Déjean, entitled "TYPOGRAPHICAL BLOCK GENERATION";

U.S. patent application Ser. No. 13/530,141, filed Jun. 22, 2012, Publication No. 2013/0343658, published Dec. 26, 2013, by Hervé Déjean, entitled "SYSTEM AND METHOD FOR IDENTIFYING REGULAR GEOMETRIC STRUCTURES IN DOCUMENT PAGES";

U.S. patent application Ser. No. 13/911,452, filed Jun. 6, 2013, by Hervé Déjean, entitled "METHODS AND SYSTEMS FOR GENERATION OF DOCUMENT STRUCTURES BASED ON SEQUENTIAL CONSTRAINTS";

U.S. patent application Ser. No. 13/943,263, filed Jul. 16, 2013, by Hervé Déjean, and entitled "PAGE FRAME AND PAGE COORDINATE DETERMINATION METHOD AND SYSTEM BASED ON SEQUENTIAL REGULARITIES"; and U.S. patent application Ser. No. 14/107,333, filed Dec. 16, 2013, by Hervé Déjean et al., and entitled "METHOD AND SYSTEM OF EXTRACTING STRUCTURED DATA FROM A DOCUMENT", are incorporated herein by reference in their entirety.

BACKGROUND

The exemplary embodiments disclosed herein relate to document processing and find particular application in connection with a method and system for extracting data from a digital version of a document. Specifically, according to an exemplary embodiment, a method and system is provided to extract data from a document including a tabulated layout, e.g., forms, invoices, etc.

While the use of electronically created and recorded documents is prevalent, many such electronic documents are in a form that does not permit them to be used other than for viewing or printing. To provide greater accessibility to the content of such documents, it is desirable to understand their structure. However, when electronic documents are recovered by scanning a hardcopy representation or by recovering an electronic representation, e.g., PDF (Portable Document Format) or Postscript representation, a loss of document structure usually results because the representation of the document is either at a very low level, e.g., bitmap, or an intermediate level, e.g., a document formatted in a page description language or a portable document format.

Geometric or physical page layout analysis can be used to recognize the different elements of a page, often in terms of text regions and image regions. Methods are known for determining a document's logical structure, or the order in which objects are laid out on a document image, i.e., layout objects. Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy et al., "A PROTOTYPE DOCUMENT IMAGE ANALYSIS SYSTEM FOR TECHNICAL JOURNALS", CSE Journal Article, Department of Computer Science and Engineering, pages 10-22, July, 1992 and the Smearing algorithm, described by Wong et al., "Document analysis system", IBM Journal of Research and Development, volume 26, No. 6, pages 647-656, November, 1982. These GPLA algorithms receive as input a page image and perform a segmentation based on information, such as pixel information, gathered from the page. These approaches to element recognition are either top-down or bottom-up and mainly aim to delimit boxes of text or images in a page. These methods are useful for segmenting pages one dimensionally, into columns.

In addition, as disclosed in U.S. patent application Ser. No. 13/911,452, filed Jun. 6, 2013, by Hervé Déjean, entitled "METHODS AND SYSTEMS FOR GENERATION OF DOCUMENT STRUCTURES BASED ON SEQUENTIAL CONSTRAINTS", a method and system is provided that structures a sequentially-ordered set of elements, each being characterized by a set of features. N-grams, i.e., a sequence of n features, are computed from a set for n contiguous elements, and n-grams which are repetitive, e.g., Kleene cross, are selected. Elements matching the most frequent repetitive n-gram are grouped together under a new node, and a new sequence is created. The method is iteratively applied to this new sequence. The output is an ordered set of trees.

A common task in document analysis is extracting data from an unstructured document, sometimes referred to as indexing. The extracted data can correspond to a single piece of text, such as an invoice number, or to structured data including several fields, such as an invoice item having a description, price per unit, total amount, etc. For purposes of this disclosure, this structured data is referred to as sdata (structured data).

A primary issue in extracting structured data is the lack of correspondence between the sdata/data fields and the way their layout is performed, except for documents which mostly follow a layout template such as forms. In some documents, one homogeneous block can contain all the data fields. In another document, each field may be spread over table cells. No generic algorithm can systematically provide segmentation where found layout elements correspond to a single sdata. An analysis combining layout information and content information is then required to identify complete sdata.

This disclosure provides a method and system to extract data from documents including a tabulated layout, such as forms, especially invoices. The method and system targets a specific data type called label:value, the label part corresponding to a string representing the data label, associated to its value part.

INCORPORATION BY REFERENCE

U.S. Pat. No. 7,668,372, issued Feb. 23, 2010, by Matthias Schiehlen, and entitled "METHOD AND SYSTEM FOR COLLECTING DATA FROM A PLURALITY OF MACHINE READABLE DOCUMENTS";

U.S. Pat. No. 7,752,538, issued Jul. 6, 2010, by Jean-Yves Vion-Dury, and entitled "GRAPHICAL SYNTAX ANALYSIS OF TABLES THROUGH TREE REWRITING";

U.S. Pat. No. 8,270,721, issued Sep. 18, 2012, by Jean-Yves Vion-Dury, and entitled "METHOD AND SYSTEM FOR ACQUIRING DATA FROM MACHINE-READABLE DOCUMENTS";

Belaïd, Yolande and Belaïd, Abdel, article entitled "Morphological Tagging Approach in Document Analysis of Invoices", 17th International Conference on Pattern Recognition (ICPR'2004). (Cambridge, UK). IEEE, 2004. pages 469-472;

Alberto Bartoli, Giorgio Davanzo, Eric Medvet, and Enrico Sorio, article entitled "Semisupervised Wrapper Choice and Generation for Print-Oriented Documents", Department of Engineering and Architecture (DIA), University of Trieste, Via Valerio 10, 34127 Trieste, Italy, IEEE Transactions on Knowledge and Data Engineering, Vol. 26, No. 1, January 2014, pages 208-220;

Bill Janssen, Eric Saund, Eric Bier, Patricia Wall, and Mary Ann Sprague, article entitled "Receipts2go: The Big World of Small Documents", In Proceedings of the 2012 ACM symposium on Document Engineering (DocEng '12), Sep. 4-7, 2012, 4 pages, are incorporated herein by reference in their entirety.

BRIEF DESCRIPTION

In one embodiment of this disclosure, described is a computer implemented method of extracting structural label and value pairwise data associated with a digital version of a document, the method comprising: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) processing the one or more lines of textual elements to identify and tag textual elements associated with label and value pairwise data; c) processing the one or more layout structures and associated tagged textual elements to generate one or more respective label:value sequences of tagged textual elements representative of a respective layout structure; and d) extracting label and value pairwise data from the one or more label:value sequences of tagged elements.

In another embodiment of this disclosure, described is an image processing system comprising: a processor configured to receive a digital version of a document, the processor configured to execute instructions to perform a method of extracting structured label and value pairwise data associated with the digital version of the document, the method comprising: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) processing the one or more lines of textual elements to identify and tag textual elements associated with label and value pairwise data; c) processing the one or more layout structures and associated tagged textual elements to generate one or more respective label:value sequences of tagged textual elements representative of a respective layout structure; and d) extracting label and value pairwise data from the one or more label:value sequences of tagged elements.

In still another embodiment of this disclosure, described is a computer program product comprising: a non-transitory computer-usable data carrier storing instructions that, when executed by a computer, cause the computer to perform a method of extracting label and value pairwise data associated with a digital version of a document, the method comprising: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) processing the one or more lines of textual elements to identify and tag textual elements associated with label and value pairwise data; c) processing the one or more layout structures and associated tagged textual elements to generate one or more respective label:value sequences of tagged textual elements representative of a respective layout structure; and d) extracting label and value pairwise data from the one or more label:value sequences of tagged elements.

BRIEF DESCRIPTION OF THE DRAWINGS

FIG. 1 illustrates an example of a label:value tabular structure with graphical lines, where one cell includes either a label or a value element organized by row.

FIG. 2 illustrates another redacted example of a label:value tabular structure delimited by graphical lines, each cell including a label:value structure.

FIG. 3 illustrates another redacted example of a label:value tabular structure without graphical elements where the bottom portion includes a semi-colon used to delimit label from an associated value.

FIG. 4 illustrates an example of a label:value tabulated structure organized by columns.

FIG. 5 illustrates a redacted example of a one dimensional row label:value structure.

FIG. 6 illustrates an example of a label:value tabular structure where two values are associated with a label.

FIG. 7 illustrates an example of a label:value tabular structure with no graphical lines where content position is needed to obtain the tabular structure.

FIG. 9 is a redacted example of an originally scanned invoice.

FIG. 10 is a redacted exemplary output of a textual and graphical extraction processing of the original invoice shown in FIG. 9, according to an exemplary embodiment of this disclosure.

FIG. 11 illustrates a redacted example of detected tabular structures associated with FIG. 10 according to an exemplary embodiment of this disclosure.

FIG. 12 shows a redacted example of tagged label elements and tagged value elements associated with the original invoice illustrated in FIG. 9, where a tagged value element corresponds to any text string with a digit, and a tagged label element corresponds to terms provided by a lexical resource.

DETAILED DESCRIPTION

Figure 8:
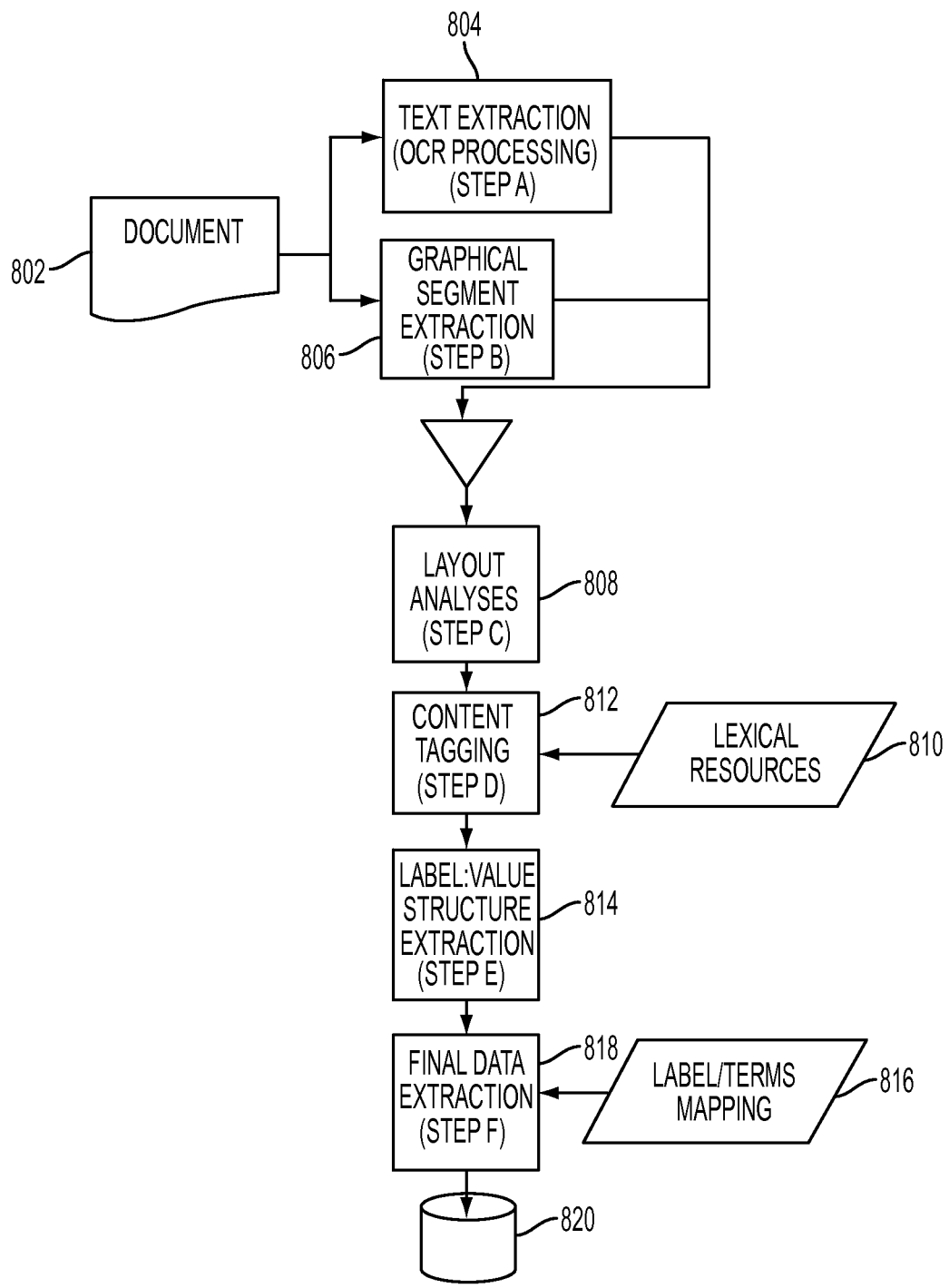
FIG. 8 is a flow chart of an exemplary embodiment of a method of extracting structured label and value pairwise data according to this disclosure.

This disclosure provides a method and system for extracting information, i.e., data, from a specific class of document images which includes, but is not limited to, forms based on tabular representations, such as invoices. More specifically, the extracted data is structured as a label:value pair, to provide semantic interpretation of the underlying knowledge conveyed by the form.

More specifically, presented in this disclosure is a method and system for extracting data from forms, e.g., invoices. According to an exemplary method, a specific data type referred to as a Label:value is targeted, the label part corresponding to a text string representing a corresponding data label, associated to its value part.

While the detailed description provided herein specifically addresses exemplary embodiments including the extraction of information from forms, it is to be understood the disclosed method and systems of extracting information apply to documents including a tabular layout in general.

Initially, textual and graphical elements are extracted from an input document such as an image document or native digital document. Then, layout structure candidates are generated where one element may belong to several layout structures, where the layout structure candidates are generated using content and graphical elements associated with the input document. Then, content corresponding to information labels is tagged.

The disclosed method and system only applies to information represented by a label:value structure. Given a set of information to be extracted, referred to as targeted information, a best match assignment is completed between targeted information and all extracted label:value pairs.

As briefly explained in the background section, a specific field of data extraction is invoice data processing where information is extracted from scanned invoices. One current approach relies on templates to extract targeted information. However, in many situations this approach is not usable because of the number of templates required. A second approach is to extract data by spotting data on a page. This basic method initially matches an information label using text string matching and regular expressions. Then, the method defines a zone around the matched text string and finds in this zone a value potentially compliant with the information type. Some positional constraints can be added, such as "look for information on the first page" top, etc. See Bill Janssen, Eric Saund, Eric Bier, Patricia Wall, and Mary Ann Sprague, article entitled "Receipts2go: The Big World of Small Documents", In Proceedings of the 2012 ACM symposium on Document Engineering (DocEng '12), Sep. 4-7, 2012, 4 pages. Similarly, "amount" key phrases that indicate a total are required to appear "Above" or "LeftOf" a currency amount entity in order to be associated with it. One drawback of this approach, which extracts data locally, is only a near context is used, which does not provide a way to assess its confidence, i.e., the "near" context can be far away. Furthermore, as the size of the set of matching rules increase, support becomes complicated.

The method and system of extracting pairwise data described herein is applied to extract information referred to as label:value information. Within a form, a customary manner of presenting data is to associate a term, i.e., label, and its respective value. The layout of label:value information can vary where a list or tabulated structure with various cell granularities is presented in a form document.

FIGS. 1-7 illustrate various examples of label:value formats which may be processed according to the exemplary method and system provided herein.

FIG. 1 illustrates an example of a label:value tabular structure with graphical lines, where one cell 100, 102, 104, 106, 108, 110, 112, 114, 116, 118, and 120 includes either a label or a value element organized by row.

FIG. 2 illustrates another redacted example of a label:value tabular structure delimited by graphical lines, each cell 200, 202, 204, 206 and 208 including a label:value structure.

FIG. 3 illustrates another redacted example of a label:value tabular structure without graphical elements where the bottom portion includes a semi-colon used to delimit label from an associated value. For example, PO Number corresponds to a label and 6606566 corresponds to a linked value.

FIG. 4 illustrates a redacted example of a label:value tabulated structure organized by columns.

FIG. 5 illustrates a redacted example of a one dimensional row label:value structure.

FIG. 6 illustrates an example of a label:value tabular structure where two values are associated with a label. For example, label "Actual Wt." corresponds to value 163 Lbs. and 74 Kgs.

FIG. 7 illustrates an example of a label:value tabular structure with no graphical lines where content position is needed to obtain the tabular structure.

FIG. 8 is a flow chart of an exemplary embodiment of a method of extracting structured label and value pairwise data according to this disclosure.

With reference to FIG. 8, described now are the steps of an exemplary method of extracting label:value pairwise data.

Step A) Text extraction 804: optical character recognition (OCR) for document image, text extraction through an Application Programming Interface (API) for a digital document 802 such as PDF.

Step B) Graphical segments extraction 806: image analysis for document image or extraction through an API for digital document 802.

Step C) Layout Analysis 808: several layout analyses are performed, using content and graphical lines.

Step D) Content tagging 812: content is tagged in order to identify labels and values occurrences. Lexical resources 810 provide a list of predefined terms used to tag label candidates.

Step E) Label:value structure extraction 814: using the sequence-based algorithm, all label:value structures are extracted.

Step F) Final information extraction 818: using a mapping table 816, extracted label:value data is associated with targeted data, i.e., data selected for extraction and stored on a data storage device.

Various aspects of the method and system are now described in greater detail below.

Text Processing (OCR) 804.

An OCR engine is applied to a scanned invoice 802. Characters and their position are extracted. According to the implementation described herein, a commercial OCR engine is used, such as TOCR, FineReader, and Nuance. Characters are grouped based on their distance in order to form textual chunks which are roughly a textual fragment in which words are in close proximity.

Graphical Segment Extraction 806.

Horizontal and vertical segments are extracted. According to the exemplary embodiment described herein, a classical Hough transform is used.

FIG. 10 is an exemplary redacted output of a textual and graphical extraction processing of an original redacted invoice shown in FIG. 9, according to an exemplary embodiment of this disclosure, where textual elements are shown boxed 1000 and graphical elements are represented as line segments 1002. Note—all text and graphical elements are not identified as 1000 and 1002 for clarity purposes.

Layout Analyses 808.

Several layout structures are recognized, including tabular and linear layout structures. Separate layout analyses can be conducted concurrently. In addition, an individual element can belong to several layout structures, which provides robustness for cases of analysis error or noise, where a partial structure can then be found and processed. A linear structure corresponds to lines, table rows, and table columns. Tabular structures are built using both graphical elements, i.e., graphical lines and positional regularities.

Graphical tabular structures: Generating tabular structures from lines can be achieved using several known methods. See U.S. Pat. No. 7,752,538, issued Jul. 6, 2010, by Jean-Yves Vion-Dury, and entitled "GRAPHICAL SYNTAX ANALYSIS OF TABLES THROUGH TREE REWRITING".

Content tabular structures: Generating content tabular structures can be achieved using U.S. Patent Publication No. 2013/0343658, published Dec. 26, 2013, by Hervé Déjean, entitled "SYSTEM AND METHOD FOR IDENTIFYING REGULAR GEOMETRIC STRUCTURES IN DOCUMENT PAGES".

Graphical tabular structure provides for text re-segmentation, by using the geometrical zones the lines created. Re-segmentation using content tabular structure is relatively more complicated.

FIG. 11 illustrates a redacted example of detected tabular structures associated with FIG. 10 according to an exemplary embodiment of this disclosure.

The top right original table 1006 generates 2 layout structures: a graphical structure 1102 including a full table, and a partial regular-content-based structure 1104 where the last row is missed due to two missing values.

Content Analysis and Tagging 812.

The purpose of this step is to tag content elements, i.e., text, in order to identify label and value elements. Text strings are parsed and label and value parts are recognized. Specifically, a list of predefined terms provided by lexical resources 810 is used in order to identify and tag label candidates. To identify and tag values, any string with at least one digit is tagged as a value and/or specific patterns such as those associated with dates, phone numbers, addresses, etc., can be used to identify and tag a string as a value.

The different cases are:

A string corresponds to a label term; or

A string corresponds to a value term; or

A string corresponds to a label and a value term.

Figure 12:
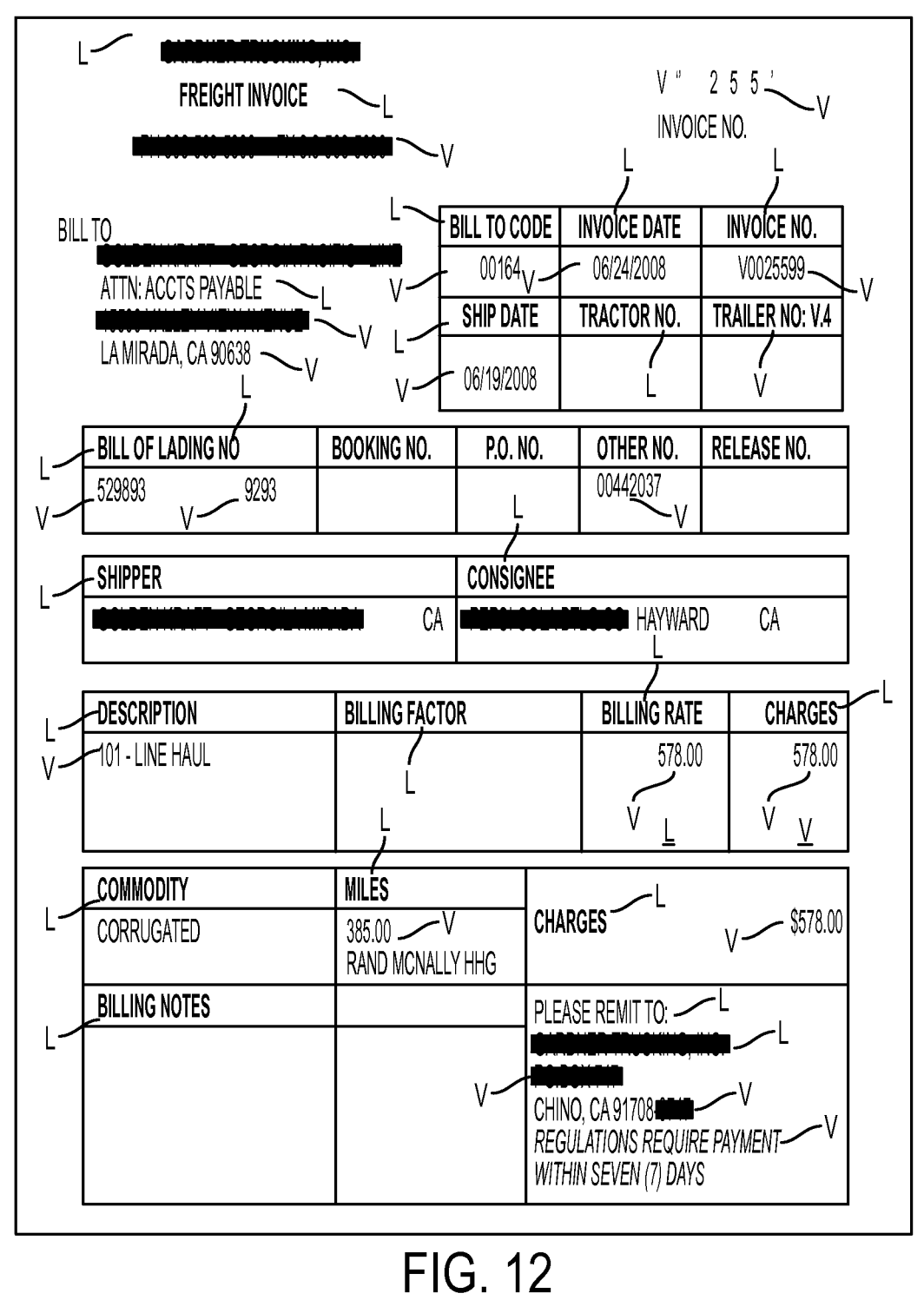

FIG. 12 shows a redacted example of tagged label elements ("L") and tagged value elements ("V") associated with the original invoice illustrated in FIG. 9, where a tagged value element corresponds to any text string with a digit, and a tagged label element corresponds to terms provided by a lexical resource.

Label:value structure extraction 814.

The objective here is to determine how label:value data is laid out for a given layout structure, assuming a regular organization over a given layout structure. Regularities are detected using U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS".

For each layout structure previously determined:

1) Get each sub-element (cell for tabular structure, line for a block, . . . )

2) Extract features for each sub-element (label, and/or value, or nothing), where empty cells are added a default value feature.

3) For tabular structure, generate two sequential orders: row-first sequence, and column-first sequence. Otherwise take the sequences of elements as it is for one-dimensional structures.

4) For each sequence of sub-elements:

Apply the sequence-based method described in U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS". An enrichment option of the sequence based method allows for detecting sub-elements which contains a label and a value element).

Table 1 below is an example generated from FIG. 10 (table on the top-right part). The column-first sequence of the table generates this sequence with the associated features ([X,Y]: cell position in the table):

TABLE 1

| Cell position (column-first reading) | Element | Feature |
| --- | --- | --- |
| [0,0] | Bill To Code | {label = 1} |
| [1,0] | 00164 | {value = 1} |
| [2,0] | Ship Date | {label = 1} |
| [3,0] | Jun. 16, 2008 | {value = 1} |
| [0,1] | invoice Date | {label = 1} |
| [1,1] | Jun. 19, 2008 | {value = 1} |
| [2,1] | raótor No. | {label = 1} |
| [3,1] | EMPTY | {value = 1} |
| [0,2] | invoice Ño | {label = 1} |
| [1,2] | FCO27530 | {value = 1} |
| [2,2] | railer o. | {} |
| [3,2] | EMPTY | {value = 1} |

The regular pattern (label, value) is captured by the sequence-based algorithm. See U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS". The final label:value elements are extracted as shown in Table 2 below:

TABLE 2

| Bill To Code | 00164 |
| Ship Date | Jun. 16, 2008 |
| invoice Date, | Jun. 19, 2008 |
| raótor No [Tractor No.] | <empty value> |
| invoice Ño | FCO27530 |
| railer o. [Tractor No.] | <empty value> |

Final Extraction 818: Best mapping.

Once a set of label:value data is defined, a final step includes selecting label:value data to be extracted where all information is not required.

For this, a list of concept-labels is built, describing data concepts (canonical designation) and their possible variations occurring in documents. For instance, the concept USlnvoiceNumber is associated with the following textual variations:

InvoiceNumber: 'invoice number', 'invoice no', 'invoice #', 'sales invoice', 'bill number', 'freight invoice', 'freight bill number'.

For example, using the canonical designation (InvoiceNumber) and concept instances the terms associated to it ('invoice number', 'invoice no', . . . ).

Notably, this kind of lexical resource is present in similar applications, with one difference: Usually, this lexical resource only focuses on targeted data, i.e., the final dataset to be extracted. Here, this list is extended to any label:value data present in the types of processed documents, especially frequent label:value data. The list is extended for two reasons:

First, identifying most of the labels allows for identifying the label:value structures.

Second, it allows for a better handling of OCR noise. Some OCR quality requires the use of string fuzzy matching between terms and labels. Strings whose edit-distance is above a given threshold are comparable, i.e., treated as equal. While fuzzy-matching allows for mapping noisy strings with a concept, it may also lead in practice to map a string to several concepts, as shown in Table 3 below, listing extracted label strings and associated matched concepts with scores normalized relative to a longest a common string. A strategy is then required to select the best matches. A simple strategy includes selecting the best match among all matches, to validate it, and iterate over the remaining matches ignoring the current matched concept.

Two main difficulties arise from the fact that some terms are very short which biases the edit-distance score (for example vat, ate [noisy], rate, date), and because some terms appear in many concepts, such as invoice, number, hence reducing the edit-distance score. The frequency of the terms invoice and number in the invoice terms is shown. The final extraction after best-mapping is shown below in Table 4.

TABLE 3

| Extracted string | Terms | Canonical term | Edit-distance score (longest common string. Equality = 100) |
| --- | --- | --- | --- |
| Bill to dode | Bill to code | BOLPackingSlip | 92 |
| Invoicebate | Invoice Date | InvoiceDate | 83 |
| Invoicebate | Invoice No. | InvoiceNumber | 64 |
| Dinvoice(No | Invoice No. | InvoiceNumber | 82 |
| Ship date | Ship Date | ShipDate | 100 |
| Ship date | Invoice Date | InvoiceDate | 50 |
| Tractor No | Invoice No. | InvoiceNumber | 40 |
| Trailer no: v4 | Invoice No. | InvoiceNumber | 36 |

TABLE 4

| Edit distance score | concept | string | value |
| --- | --- | --- | --- |
| 100 | ShipDate | Ship date | Jun. 19, 2008 |
| 92 | BOLPackingSlip | Bill to code | 00164 |
| 83 | InvoiceDate | Invoicebate | Jun. 24, 2008 |
| 82 | InvoiceNumber | Dinvoice(No | V0025599 |

The disclosed method and system of extracting data provides the following:

Global data extraction with high confidence: A specific combination of layout analysis and content analysis is performed to find out how label:value data is laid out, as described in Step E) Label:value structure extraction. This allows a determination of the exact mapping between layout elements (table cell or item list) and the data elements (label, value, label+value, label1/label2: value1/value2, . . . ).

Extraction of all data: A 2-step method is used to extract data: first all label:value data are extracted, then a mapping is performed between these data and the targeted data, i.e., the data desired to be extracted. This provides a manner to deal with similar terms and fuzzy matching, as described in Step F), Final data extraction. This also allows a new set of resources for a new language or domain to be designed, by simply refining a mapping table as also described in Step F) Final data extraction.

Figure 13:
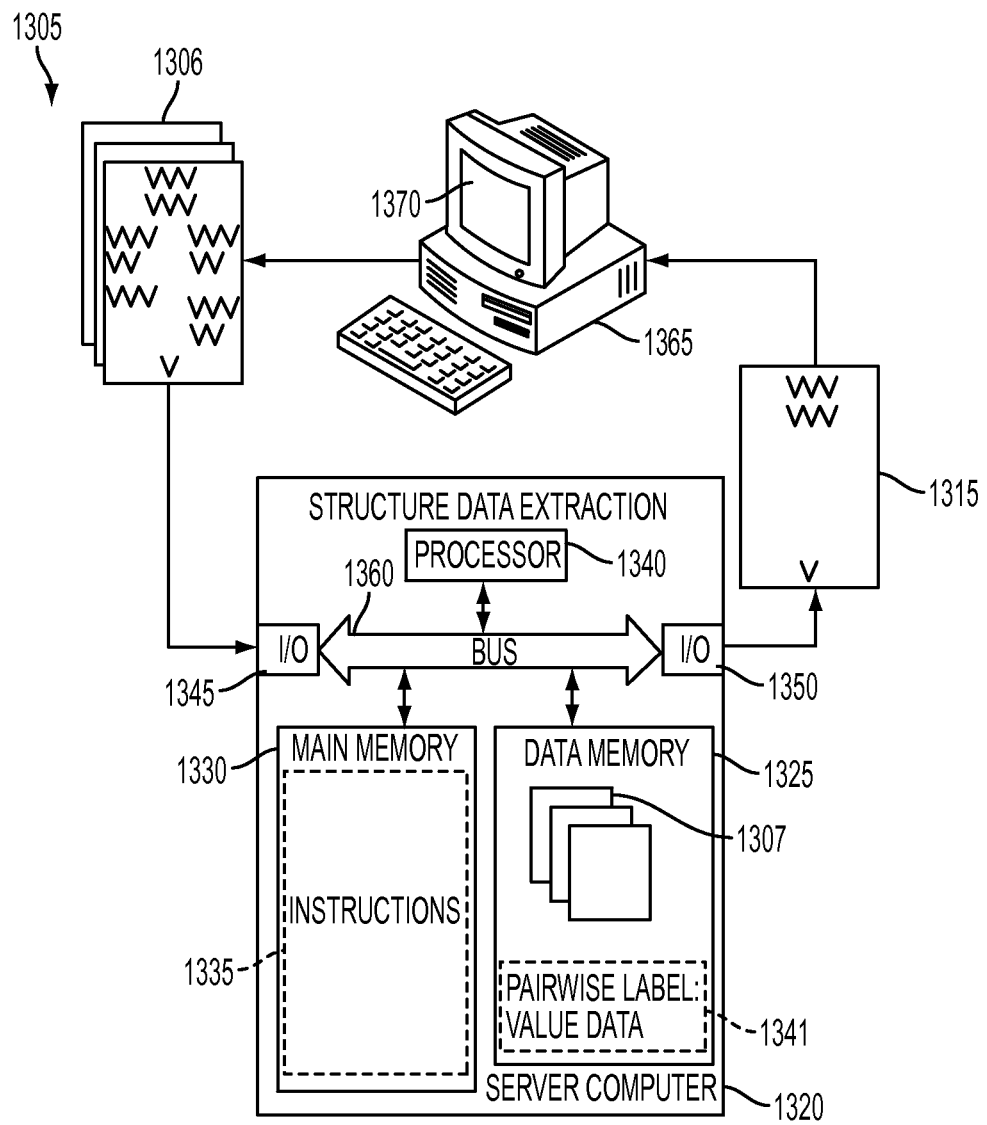
FIG. 13 is a functional block diagram of an exemplary embodiment of a document processing system which extracts structured label and value pairwise data according to this disclosure.

With reference to FIG. 13, illustrated is an exemplary system 1305 extracting data from a document 1306 according to the exemplary methods described herein. The system 1305 takes as input a document 1306 which includes one or more document pages 1310, i.e., invoices. The system outputs 1315 pairwise label: value data extracted from the document 1306 which have been identified on a document, i.e., form, and stored in data memory 1325.

The exemplary system may include one or more specific or general purpose computing devices 1320. The system receives, as input, document 1306 and stores the document in data memory 1305, as a digital representation 1307 during processing. The document is received in electronic form and can be, for example, one or more invoices. The exemplary document is in a page description language, such as a PDF, Portable Document Format (ADOBE SYSTEMS®) file, although other unstructured documents are also contemplated, such as PostScript (ADOBE SYSTEMS®), PCL, Printer Command Language (HEWLETT-PACKARD®), such as PCL-5, PCL-5E, PCL-6, PCL-XL, TIFF, BMP, Word document, or the like. In PDF, for example, each page of a document set is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 1330 of the system 1305 stores instructions 1335 for performing the exemplary method. These instructions 1335 are implemented by an associated processor 1340, such as the computer's CPU. The computer communicates with external devices via one or more input/output devices 1345, 1350. The hardware components 1325, 1330, 1340, 1345, 1350 are communicatively linked by a data/control bus 1360.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 1365, which may be similarly configured to computer 1320, except as noted, it will be appreciated that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 1325, 1330 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 1340 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIG. 8, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 1370 is linked to the client computing device 1365 and client device includes a web browser which allows the user to interact with the apparatus.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The illustrated instructions for performing the method may be in the form of hardware or a combination of hardware and software. As will be appreciated, the system may include fewer or more components while still having the same functionality. For example, components may be combined to form fewer components, or may be functionally separated to form more individual components. These components are best understood with reference to the exemplary described method, which, in part, is described with reference to FIG. 8.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH- EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of extracting structural label and value pairwise data associated with a digital version of a document, the method comprising:
    a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document;
    b) processing the one or more lines of textual elements to identify and tag textual elements associated with label and value pairwise data;
    c) processing the one or more layout structures and associated tagged textual elements to generate one or more respective label:value sequences of tagged textual elements representative of a respective layout structure; and
    d) extracting label and value pairwise data from the one or more label:value sequences of tagged elements,
    wherein step c) generates the one or more respective label:value sequences of tagged textual element using a sequence-based method to hierarchically segment a sequence of elements associated with the generated one or more layout structures associated with the digital version of the document; and
    wherein the sequence-based method includes:
    generating a set of n-prams from the sequence of elements, an n-gram including an ordered sequence of n features provided by a sequence of n named elements;
    electing sequential n-grams from the set of n-grams, the sequential n-grams defined as similar contiguous n-grams;
    selecting a most frequent sequential n-pram from the elected sequential n-grams; and
    generating a new sequence of the elements by matching the selected most frequent sequential n-gram against the sequence of elements associated with the document, replacing matched elements of the sequence of elements with a respective node, and associating the matched elements of the sequence of elements as children of the respective node.

2. The computer implemented method of extracting structural label and value pairwise data according to claim 1, wherein the structural elements are associated with one or more of a line of text, and a block of text, the text including one or more of letters, numbers and symbols.

3. The computer implemented method of extracting structured label and value pairwise data according to claim 1, wherein the one or more layout structures are associated with one or more of a 1D (Dimensional) structure and a 2D structure.

4. The computer implemented method of extracting structured label and value pairwise data according to claim 1, wherein prior to step a) text extraction and graphical segment extraction are performed on the digital document.

5. The computer implemented method of extracting structured label and value pairwise data according to claim 1, wherein a predefined list of terms is used to identify and tag textual elements associated with label data.

6. The computer implemented method of extracting label and value pairwise data according to claim 1, wherein a predefined set of one or more patterns is used to identify and tag textual elements associated with value data.

7. The computer implemented method of extracting label and value pairwise data according to claim 1, wherein step b) tags textual elements as one of a label term, a value term and a label and value term.

8. The computer implemented method of extracting label and value pairwise data according to claim 1, comprising:
    e) generating a final label and value data list from the label and value pairwise data extracted in step d), the final label and value data list generated by mapping the extracted label and value pairwise data to a plurality of predefined canonical designations.

9. The computer implemented method of extracting label and value pairwise data according to claim 8, wherein an edit-distance score calculated for the extracted label and value pairwise data is used to generate the final label and value data list.

10. The computer implemented method of extracting label and value pairwise data according to claim 1, wherein the label and value pairwise data is associated with an invoice.

11. An image processing system comprising:
    a processor configured to receive a digital version of a document, the processor configured to execute instructions to perform a method of extracting structured label and value pairwise data associated with the digital version of the document, the method comprising:
    a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document;
    b) processing the one or more lines of textual elements to identify and tag textual elements associated with label and value pairwise data;
    c) processing the one or more layout structures and associated tagged textual elements to generate one or more respective label:value sequences of tagged textual elements representative of a respective layout structure; and
    d) extracting label and value pairwise data from the one or more label:value sequences of tagged elements,
    wherein step c) generates the one or more respective label:value sequences of tagged textual element using a sequence-based method to hierarchically segment a sequence of elements associated with the generated one or more layout structures associated with the digital version of the document; and
    wherein the sequence-based method includes:
    generating a set of n-grams from the sequence of elements, an n-gram including an ordered sequence of n features provided by a sequence of n named elements;

electing sequential n-grams from the set of n-grams, the sequential n-grams defined as similar contiguous n-grams;
selecting a most frequent sequential n-gram from the elected sequential n-grams; and
generating a new sequence of the elements by matching the selected most frequent sequential n-gram against the sequence of elements associated with the document, replacing matched elements of the sequence of elements with a respective node, and associating the matched elements of the sequence of elements as children of the respective node.

12. The image processing system according to claim 11, wherein the structural elements are associated with one or more of a line of text, and a block of text, the text including one or more of letters, numbers and symbols.

13. The image processing system according to claim 11, wherein the one or more layout structures are associated with one or more of a 1D (Dimensional) structure and a 2D structure.

14. The image processing system according to claim 11, wherein prior to step a) text extraction and graphical segment extraction are performed on the digital document.

15. The image processing system according to claim 11, wherein a predefined list of terms is used to identify and tag textual elements associated with label data.

16. The image processing system according to claim 11, wherein a predefined set of one or more patterns is used to identify and tag textual elements associated with value data.

17. The image processing system according to claim 11, wherein step b) tags textual elements as one of a label term, a value term and a label and value term.

18. The image processing system according to claim 11, wherein the method comprises:
e) generating a final label and value data list from the label and value pairwise data extracted in step d), the final label and value data list generated by mapping the extracted label and value pairwise data to a plurality of predefined canonical designations.

19. The image processing system according to claim 18, wherein an edit-distance score calculated for the extracted label and value pairwise data is used to generate the final label and value data list.

20. The image processing system according to claim 11, wherein the label and value pairwise data is associated with an invoice.

21. A computer program product comprising:
a non-transitory computer-usable data carrier storing instructions that, when executed by a computer, cause the computer to perform a method of extracting label and value pairwise data associated with a digital version of a document, the method comprising:
a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document;
b) processing the one or more lines of textual elements to identify and tag textual elements associated with label and value pairwise data;
c) processing the one or more layout structures and associated tagged textual elements to generate one or more respective label:value sequences of tagged textual elements representative of a respective layout structure; and
d) extracting label and value pairwise data from the one or more label:value sequences of tagged elements,
wherein step c) generates the one or more respective label:value sequences of tagged textual element using a sequence-based method to hierarchically segment a sequence of elements associated with the generated one or more layout structures associated with the digital version of the document; and
wherein the sequence-based method includes:
generating a set of n-grams from the sequence of elements, an n-gram including an ordered sequence of n features provided by a sequence of n named elements;
electing sequential n-grams from the set of n-grams, the sequential n-grams defined as similar contiguous n-grams;
selecting a most frequent sequential n-gram from the elected sequential n-grams; and
generating a new sequence of the elements by matching the selected most frequent sequential n-gram against the sequence of elements associated with the document, replacing matched elements of the sequence of elements with a respective node, and associating the matched elements of the sequence of elements as children of the respective node.

22. The computer program product according to claim 21, wherein prior to step a) text extraction and graphical segment extraction are performed on the digital document.

23. The computer program product according to claim 21, wherein step b) tags textual elements as one of a label term, a value term and a label and value term.

24. The computer program product according to claim 21, the method comprising:
e) generating a final label and value data list from the label and value pairwise data extracted in step d), the final label and value data list generated by mapping the extracted label and value pairwise data to a plurality of predefined canonical designations.

25. The computer program product according to claim 24, wherein an edit-distance score calculated for the extracted label and value pairwise data is used to generate the final label and value data list.

* * * * *